(No Model.)

W. H. TINSLEY.
FISH TRAP.

No. 492,123. Patented Feb. 21, 1893.

Witnesses
B. S. Ober
N. J. Riley

Inventor
W. H. Tinsley,
By his Attorneys,
C. A. Snow & Co.

UNITED STATES PATENT OFFICE.

WYATTE H. TINSLEY, OF HOMER, LOUISIANA, ASSIGNOR OF ONE-HALF TO HENRY H. McKEE, OF SAME PLACE.

FISH-TRAP.

SPECIFICATION forming part of Letters Patent No. 492,123, dated February 21, 1893.

Application filed October 28, 1892. Serial No. 450,217. (No model.)

*To all whom it may concern:*

Be it known that I, WYATTE H. TINSLEY, a citizen of the United States, residing at Homer, in the parish of Claiborne and State of Louisiana, have invented a new and useful Fish-Trap, of which the following is a specification.

The invention relates to improvements in fish traps.

The object of the present invention is to provide a simple and effective fish trap adapted to be employed in either still or running water, and capable of readily accommodating various sizes of fish.

The invention consists in the construction and novel combination and arrangement of parts hereinafter fully described, illustrated in the accompanying drawings and pointed out in the claims hereto appended.

Figure 1:
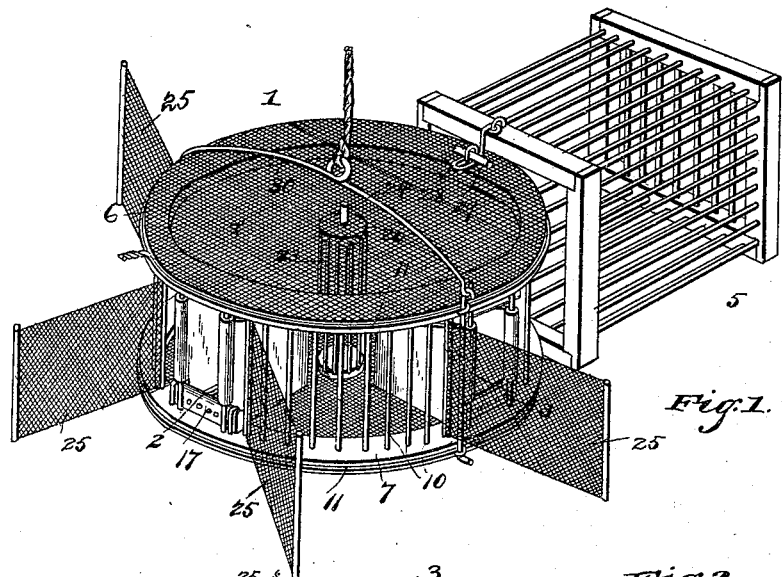
Figure 2:
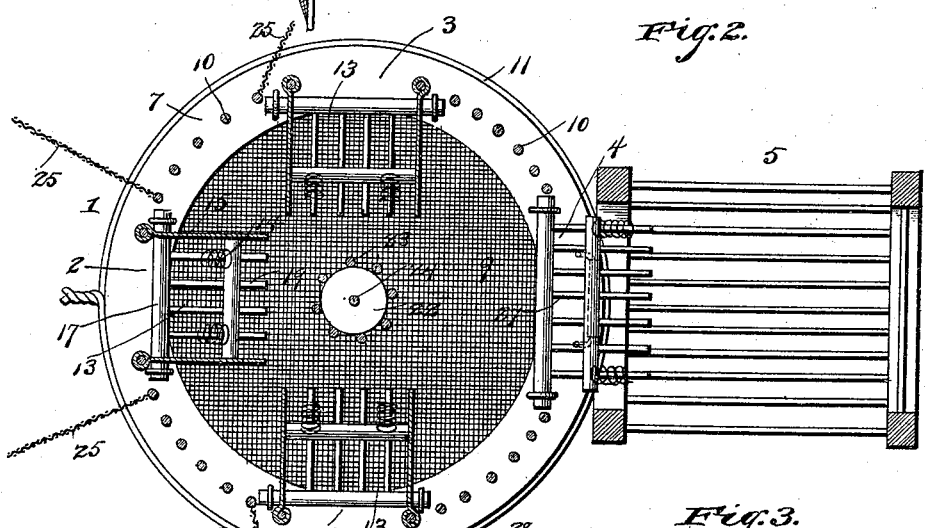
Figure 3:
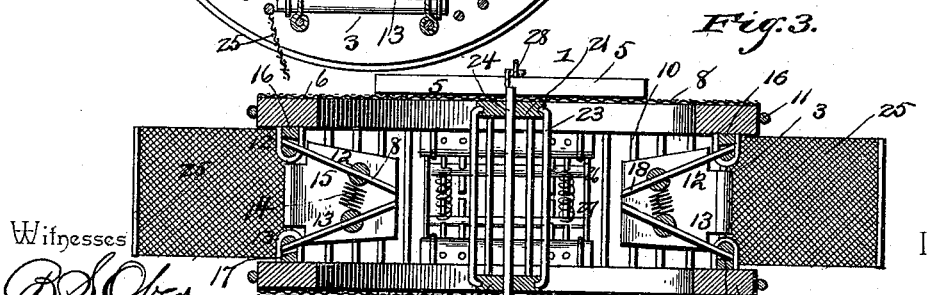

In the drawings—Figure 1 is a perspective view of a trap constructed in accordance with this invention. Fig. 2 is a horizontal sectional view. Fig. 3 is a transverse sectional view.

Like numerals of reference indicate corresponding parts in all the figures of the drawings.

1 designates a trap of cylindrical or other preferred shape and having front and side entrance openings 2 and 3 and a rear exit opening 4 communicating with a cage 5 which is hinged to the trap at the bottom thereof, and is detachably secured at its top to the trap, and is adapted to be swung back when the trap is lifted to empty its contents. The trap is composed of upper and lower frames 6 and 7, which are circular, strong wire gauze top and bottom 8 and 9 which are secured to said frames and vertical wire rods 10 having their ends secured in the upper and lower frames and arranged at regular intervals and forming the sides of the trap which is braced by wire rings 11 extending around the circular frame.

At the entrance openings are arranged inclined vertically swinging doors 12 and 13 hingedly connected with the upper and lower frames, and each pair of doors is connected by spiral springs 14 which hold the outer ends of the doors together to prevent the escape of fish, but which permit the doors to readily open or expand to allow the entrance of a large or small fish into the trap. At the sides of the doors are arranged inwardly extending plates 15 which are approximately triangular, and which are secured at their outer ends to adjacent wire rods 10, and are recessed near their outer ends to receive bars 16 and 17 of the doors. The doors have parallel wires 18 and 19 which are secured in openings of the bars 16 and 17, and these openings are vertically enlarged at their inner ends to permit a vertical swing of the doors.

At the center of the trap is arranged an approximately cylindrical bait receptacle 20 which is rotatably mounted, and which consists of upper and lower blocks 21 and 22 forming the top and bottom of the receptacle, and parallel wires 23 arranged at intervals and secured to the edges of the blocks 21 and 22, and the latter have central openings through which pass a spindle wire 24 journaled in the top and bottom of the trap.

Extending from the front and opposite sides of the trap adjacent to the entrance openings are angularly disposed wings 25, which, when the trap is employed in running order, serve to direct fish to the entrances.

At the exit opening 4 are located spring actuated doors 26 and 27 constructed similarly to the doors 12 and 13, and adapted to prevent the return of fish from the cage 5 which is designed to be provided with bait or a bait receptacle containing bait, to attract fish to free the trap, and leave the same unimpeded by the fish caught or trapped. The top of the cage is detachably secured to the trap by an angularly bent wire hasp 28, which is stapled to the cage and which is provided at its ends with eyes, the outer one of which is adapted to be secured to a staple of the trap by a pin 29.

The trap is provided with a bail 30 to receive a rope, by means of which it is lowered into and removed from a body of water.

What I claim is—

1. The combination of a trap having entrance openings and an exit opening and comprising upper and lower frames, a top and a bottom secured to the frames, vertical rods forming the sides of the trap and secured to the frames, a cage arranged at the exit opening and hingedly connected to the bottom of the trap and detachably secured to the top thereof, the hinged doors adapted to swing vertically and extending inward from the entrance openings and outward from the exit openings and projecting into the cage, spiral springs connecting the doors and the inwardly extending triangular plates arranged at the sides of the doors at the entrance openings, substantially as described.

2. The combination of a trap having entrance openings and comprising upper and lower frames, a top and a bottom secured to the frame, and the rods forming the sides of the trap, inwardly extending hinged doors adapted to swing vertically, springs connecting the doors, plates extending inward at the sides of the doors, and a bait receptacle comprising upper and lower blocks forming the top and bottom, vertical wires secured to the blocks and forming the sides of the receptacle, and a centrally disposed spindle wire passing through the blocks, and secured to the top and bottom of the trap, substantially as described.

3. The combination of a trap having entrance openings and comprising upper and lower frames, a top and bottom secured to the frame, and the vertical rods arranged at intervals and forming the sides of the trap and having their ends secured to the frame, the vertically swinging upper and lower inclined doors, springs connecting the doors, the inwardly extending triangular plates arranged at opposite sides of the doors and forming passages and the angularly disposed wings extending from the trap at the entrance openings, substantially as described.

In testimony that I claim the foregoing as my own I have hereto affixed my signature in the presence of two witnesses.

his
WYATTE  ×  H. TINSLEY.
     mark.

Witnesses:
 R. V. REID,
 WM. M. LITTLE.